June 8, 1948.  W. A. RAY  2,442,877
FLUID CONTROL VALVE
Original Filed Feb. 13, 1941
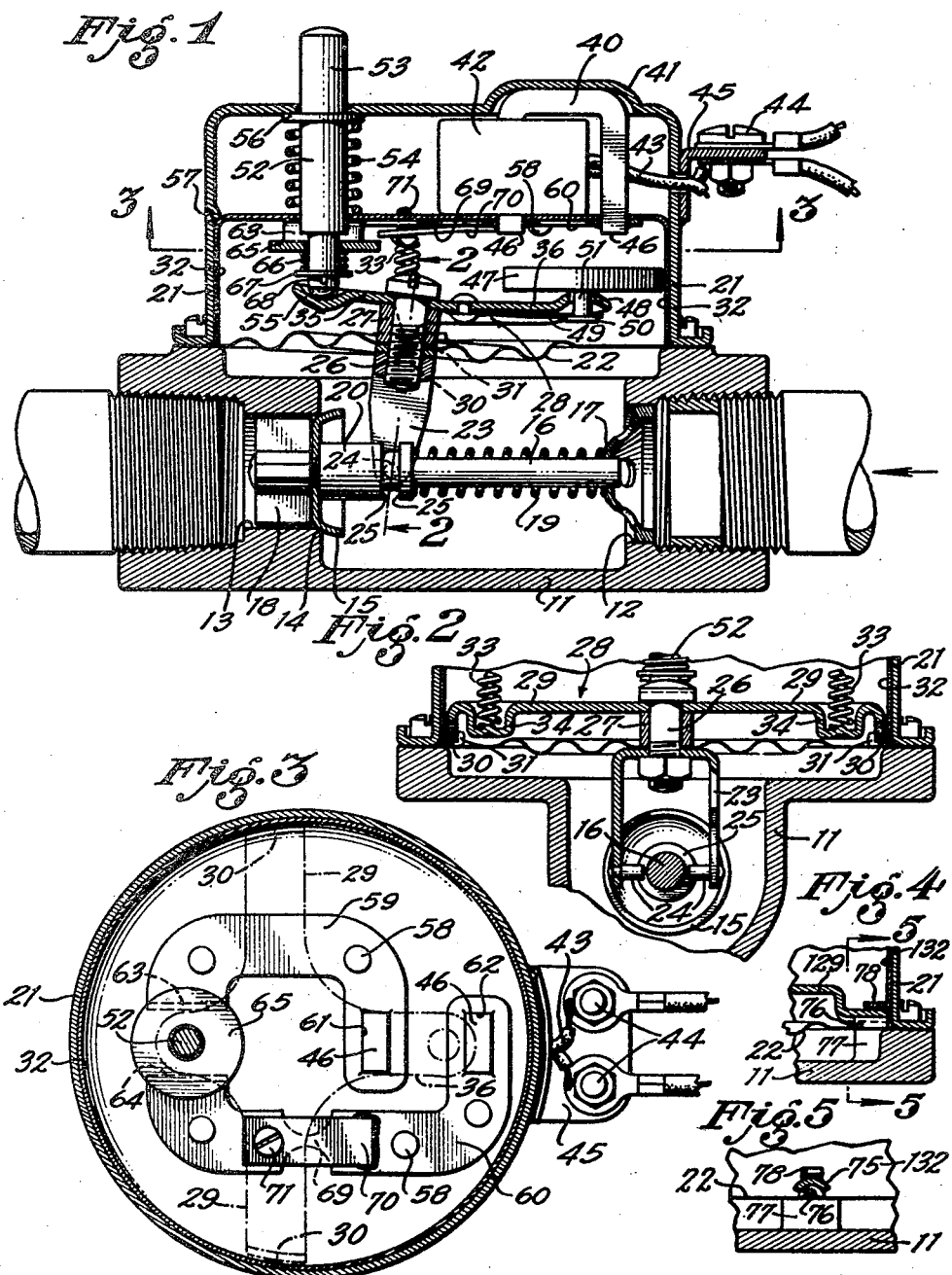
WILLIAM A. RAY,
INVENTOR;
By John H. Rouse,
ATTORNEY.

Patented June 8, 1948

2,442,877

UNITED STATES PATENT OFFICE 2,442,877

FLUID CONTROL VALVE

William A. Ray, Los Angeles, Calif., assignor to General Controls Co., a corporation Original application February 13, 1941, Serial No. 378,756, now Patent No. 2,354,704, dated August 1, 1944. Divided and this application May 22, 1944, Serial No. 536,699

5 Claims. (Cl. 137—139)

This invention relates to control devices, and more particularly to fluid control valves of the manual-reset type; the present application being a division of my copending application, Serial No. 378,756, filed February 13, 1941; now Patent No. 2,354,704, granted August 1, 1944.

A valve of the type indicated is adapted to be temporarily operated to one controlling position, usually an open position, in which position it is maintained against a biasing force by means responsive to a condition which is a prerequisite to the maintenance of the valve in that position; for example, if the valve is employed in a gas-burner control system, an electromagnet may be provided for maintaining the valve in open position, the electromagnet being energized, for example, by means responsive to the flame of a pilot burner, such as a thermal cut-out controlling any convenient source of electrical energy, or by a thermoelectric generating device heated by the flame. By such an arrangement, the valve cannot be maintained in open position, except by the manual means, in the event that the pilot flame is extinguished.

In valves of the character described, it is desirable to shield the resetting means and the electromagnet, or other maintaining means, from the fluid controlled by the valve. A convenient and practical means for that purpose is a flexible diaphragm arranged to close an opening in a wall of the valve casing; the valve-operating means being secured to the diaphragm and sealingly extending therethrough into the casing. However, by such an arrangement, there may be a tendency for the fluid pressure in the casing to affect the resetting operation and/or the maintaining means, particularly, in connection with the latter, when only a small amount of energy, such as that produced by a pilot-burner-heated thermoelectric generating device, is available for maintaining the valve in its reset condition. It is therefore a main object of this invention to provide a device of the general character described wherein fluid pressure applied to the diaphragm has substantially no effect upon the resetting and/or maintaining means.

Other objects and advantages of the invention will be found in the description, the drawing, and the claims; and, for full understanding of the invention, reference is to be had to the following detailed description and accompanying drawing, wherein:

Figure 1 is a longitudinal sectional view of a valve embodying my invention;

Figure 2 is a fragmentary transverse section taken along the line 2—2 of Fig. 1;

Figure 3 is a horizontal section taken along the line 3—3 of Fig. 1;

Figure 4 is a fragmentary section illustrating a modified pivoting arrangement for the valve-operating lever; and Figure 5 is a section taken along the line 5—5 of Fig. 4.

In the drawing, the numeral 11 indicates a valve casing having axially aligned inlet and outlet openings 12 and 13, respectively. Cooperable with a seat 14 formed at the inner end of the outlet opening is a closure member 15 mounted on a rod 16, which rod is guided at its right-hand end in an apertured cup-shaped washer 17 pressed in the inlet opening 12. The left-hand end of rod 16 is guided by a vaned member 18 secured thereto and freely slidable in the outlet opening 13. A spring 19, compressed between an enlarged portion 20 of the rod and the washer 17, urges the closure member toward its seat. Covering an opening in the upper wall of the casing and secured thereto is a housing 21. Interposed at its margins between the flanged lower portion of this housing and the surface of the casing surrounding the opening is a corrugated metallic diaphragm 22. Extending from the underside of the diaphragm is a U-shaped closure-operating member 23, in the lower portions of the side arms of which are pins 24, freely received in an annular recess 25 formed in the enlarged portion 20 of the rod 16. The member 23 is secured to the diaphragm by a bolt 26 which extends through an opening concentric of the corrugated portion thereof. Also secured to the diaphragm by the bolt 26, with a bushing 27 therebetween, is a cross-shaped lever 28, the general contour of which is shown in dot-and-dash lines in Fig. 3. The arms 29 of this lever are provided at their downwardly-turned outer ends with knife-edged portions 30 which bear in V-shaped notches cut in upwardly-turned lug portions 31 formed on the lower end of a sub-housing 32, which sub-housing fits snugly within the main housing 21. The lever 28 is thus pivoted substantially in the general plane of the diaphragm 22, and is held in that position by the force of a pair of springs 33, compressed between the arms 29 and the upper wall of the sub-housing 32. The pivots of the lever also being on a line which intersects the axis of member 23 at the diaphragm, no appreciable amount of fluid is displaced in the flexing of the diaphragm as the lever is rocked, and for the same reason, the fluid pressure below the diaphragm has no tendency to rock, or impede rocking of, the lever. So that the springs 33 will not produce a toggle action when the lever is rocked, the arms 29 are provided with depressed portions 34 for receiving the springs so that their lower ends are substantially in the axis of rotation of the lever. The cross-shaped lever 28 has an additional pair of arms 35—36 which extend at right-angles to the arms 29.

Mounted in the upper part of the housing 21 is an electromagnet comprising a U-shaped core 40, the upper end of which is received in a recess 41 formed in the top wall of the housing. Surrounding one of the side arms of the U-shaped core is a coil 42, the leads 43 of which extend through an opening in the side wall of the housing and are connected to terminals 44, insulatingly mounted in a bracket 45 secured to the housing. The side arms of the core extend through openings in the top wall of the sub-housing, and the electromagnet is maintained in position by its coil. Cooperable with the pole faces 46 of the core is an armature 47 which is rockably mounted on an up-set end portion 48 of the arm 36, the armature being resiliently held to the arm by a leaf spring 49 compressed against the inner surface of the head 50 of a pin 51 secured to the armature. This rockable mounting of the armature permits accurate alignment of its upper surface with the pole faces 46 when these parts are brought together.

Reciprocable in aligned openings formed in the top walls of housing 21 and sub-housing 32 is a rod 52, the outer end portion 53 of which forms a manually operable push-button. Compressed between a shoulder 56 formed on rod 52 and the upper wall of the sub-housing 32 is a spring 54 which urges the rod upwardly, its movement in this direction being limited by the shoulder 56. The rounded lower end of rod 52 engages a cupped portion 55 of lever arm 35, downward movement of push-button 53 serving to rock the lever about its pivots so that the closure member 15 is moved into open position and armature 47 is simultaneously brought into engagement with the pole faces 46 of the core. If, when this occurs, the core 40 is sufficiently energized by passage of current through coil 42, upon release of push-button 53, since the armature is then magnetically held in engagement with the pole faces, the closure member is retained in open position against the bias of spring 19. If the current through coil 42 is interrupted or sufficiently weakened, the armature is released from the core and the valve closes.

Secured to the underside of the top wall of the housing, as by rivets 58, is a pair of generally U-shaped straps 59—60 of high-permeability ferrous material. The right-hand end portions of the straps 59—60 are provided with rectangular openings 61 and 62, respectively, which conform to the cross-sectional shape of and tightly fit the core arms, so that the straps form branches of the magnetic circuit of the core. The left-hand end portions of the straps are downwardly bent to provide spaced portions 63—64 which, when the push-button 53 is in its normal retracted position, are bridged by an iron disk 65 carried on the reduced lower end portion of rod 52. A spring 66, compressed between a washer 67 (abutting a pin 68 pressed in a hole in the lower end of the reduced end portion of rod 52) and the washer 65, urges the same upwardly into engagement with the edges of portions 63—64 when the push-button is in its retracted position. When the button is depressed, the washer 65 is moved out of bridging-engagement by the enlarged upper portion of rod 52. The disk 65 is a loose fit on the rod so that its upper surface can conform to the edges of portions 63—64. It will be understood that the housing 21 and sub-housing 32 are both of non-magnetic material. When in the operation of the valve, the armature is magnetically held in engagement with the pole faces of the core, upon release of the push-button 53 the magnetic circuit of the core is shunted by the magnetic circuit comprising straps 59—60 and disk 65, with the result that the magnetic force acting to hold the armature is reduced. This reduction in armature-holding flux tends to equalize the hold-in and drop-out values of the electro-magnet current. So that the reluctance of the magnetic circuit can be adjusted, a portion 69 of strap 60 is reduced in size and a magnetic strip 70, welded at its right-hand end to strap 60, is arranged to variably bridge this reduced portion. A screw 71, passing through an opening in the other end of the strip and threaded in the top wall of the sub-housing 32, permits variation of the surface contact of the strip.

In Figs. 4 and 5, the numeral 129 indicates a modified form of the arm 29 shown in Figs. 1–3. The end portion of the arm 129 is downwardly bent and provided with a horizontal concave portion 75 which rides on a semi-cylindrical member 76, secured as by solder to the upper surface of diaphragm 22 adjacent its margin and above an extended lug portion 77 of the casing 11. A lower end portion 78 of the sub-housing 132 (which corresponds to the sub-housing 32 in Figs. 1–3) is bent up to form an abutment for the arm 129 so as to prevent raising of the same from its pivots by excessive fluid pressure below the diaphragm. By the arrangement shown in Figs. 4 and 5, it will be seen that the arm 129 can be pivoted in the theoretical plane of the diaphragm.

The embodiment of my invention herein shown and described is obviously susceptible of modification without departure from the spirit of the invention, and I intend therefore to be limited only by the scope of the appended claims.

I claim as my invention:

1. In a control device: means, including a flexible diaphragm, defining a chamber; a rockable lever member having a main portion disposed in a plane substantially parallel to that of said diaphragm and at the side of the diaphragm away from said chamber, the ends of said main portion extending to opposite margins of the diaphragm and being pivoted in the plane of the diaphragm; said lever member having an arm-portion extending generally at right-angles to said main portion from a point intermediate the ends thereof, said arm-portion being secured to said diaphragm and extending therethrough; and condition-controlling means in said chamber and operable by said arm-portion.

2. In a fluid control valve: a valve casing, means in said casing for controlling fluid flow therethrough, a flexible diaphragm closing an opening in a wall of said casing, and a rockable lever member comprising a main portion disposed exteriorly of the casing and in a plane substantially parallel to that of said diaphragm, the ends of said main portion extending to opposite margins of the diaphragm and being pivoted in the plane of the diaphragm, said lever member also comprising an arm-portion extending generally at right-angles to said main portion from a point intermediate the ends thereof, said arm-portion being secured to said diaphragm and sealingly extending therethrough for operating said flow-controlling means.

3. In a fluid control valve: a valve casing; means in said casing for controlling fluid flow therethrough; a flexible diaphragm closing an opening in a wall of said casing; a rockable lever member comprising a main portion disposed exteriorly of the casing and in a plane substantially parallel to that of said diaphragm, the ends of said main portion extending to opposite margins of the diaphragm and being pivoted in the plane of the diaphragm, said lever member also comprising an arm-portion extending generally at right-angles to said main portion from a point intermediate the ends thereof, said arm-portion being secured to said diaphragm and sealingly extending therethrough for operating said flow-controlling means; means biasing said lever member to one rocked position; means for temporarily rocking the lever member to another position; and means responsive to a condition which is a prerequisite to the maintenance of the lever member in said other position for so maintaining the same against the force of said biasing means.

4. In a fluid control valve: a valve casing; means in said casing for controlling fluid flow therethrough; a flexible diaphragm closing an opening in a wall of said casing; a rockable lever member comprising a cross-shaped portion disposed exteriorly of the casing and in a plane substantially parallel to that of said diaphragm, the free ends of one aligned pair of arms of said cross-shaped portion extending to opposite margins of the diaphragm and being pivoted substantially in the general plane of the diaphragm, said lever member also comprising an arm-portion extending generally at right-angles to said cross-shaped portion from a point intermediate the free ends thereof, said arm-portion being secured to said diaphragm and sealingly extending therethrough for operating said flow-controlling means; means biasing said lever member to one rocked position; an electromagnet comprising a core member and an armature member, one of said electromagnet members being fixed with respect to the casing and the other of the electromagnet members being mounted on one of the other pair of arms of the cross-shaped portion; and means, engageable with the other one of said other pair of arms of the cross-shaped portion, for rocking the lever member to another position wherein said electromagnet members interengage; said electromagnet, when energized, being adapted to maintain the lever member in said other position against the force of said biasing means.

5. In a fluid control valve: a valve casing, means in said casing for controlling fluid flow therethrough, a flexible diaphragm closing an opening through a wall of said casing and secured at its margin to the outer surface of said wall, a rockable lever member comprising a main portion disposed exteriorly of the casing and in a plane substantially parallel to that of said diaphragm, the ends of said main portion extending to opposite margins of the diaphragm and being fulcrumed substantially in the plane thereof, and spring means urging the lever member toward its fulcrumed position and acting thereon substantially in the plane of the fulcrum, said lever member also comprising an arm-portion extending generally at right-angles to said main portion from a point intermediate the ends thereof, said arm-portion being secured to said diaphragm and sealingly extending therethrough for operating said flow-controlling means.

WILLIAM A. RAY.

REFERENCES CITED

The following references are of record in the file of this patent:

UNITED STATES PATENTS

| Number | Name | Date |
|---|---|---|
| 1,883,957 | Koch | Oct. 25, 1932 |
| 2,110,326 | DeLancey | Mar. 8, 1938 |
| 2,245,834 | Sparrow | June 17, 1941 |
| 2,252,029 | Pieper | Aug. 12, 1941 |
| 2,367,087 | Beecher | Jan. 9, 1945 |